United States Patent [19]

Brammerlo

[11] 4,241,274

[45] Dec. 23, 1980

[54] DYNAMOELECTRIC MACHINE AND STATIONARY ASSEMBLY THEREFOR

[75] Inventor: Allen A. Brammerlo, Sycamore, Ill.

[73] Assignee: General Electric Company, Fort Wayne, Ind.

[21] Appl. No.: 904,607

[22] Filed: May 10, 1978

[51] Int. Cl.³ .......................................... H02K 1/12
[52] U.S. Cl. ................................. 310/259; 310/185; 310/216
[58] Field of Search ............... 310/179, 180, 184, 185, 310/188, 194, 198, 216, 254, 258, 259

[56] References Cited

U.S. PATENT DOCUMENTS

| Re. 26,179 | 3/1967 | Brammerlo | 310/185 |
|---|---|---|---|
| 2,795,712 | 6/1957 | Suhr | 310/198 |
| 3,062,978 | 11/1962 | Smith | 310/259 |
| 3,235,762 | 2/1966 | Brammerlo | 310/185 |
| 3,343,013 | 9/1967 | Wightman | 310/254 |
| 3,633,056 | 1/1972 | Hoffmeyer | 310/180 |
| 3,783,318 | 1/1974 | Widstrand | 310/216 |

*Primary Examiner*—R. Skudy
*Attorney, Agent, or Firm*—Joseph E. Papin

[57] ABSTRACT

A two pole dynamoelectric machine has a stationary assembly of which the magnetic characteristics are defined by preselected dimensionless ratios interrelated to each other and generally correlated with preselected operation load conditions of the dynamoelectric machine.

27 Claims, 5 Drawing Figures

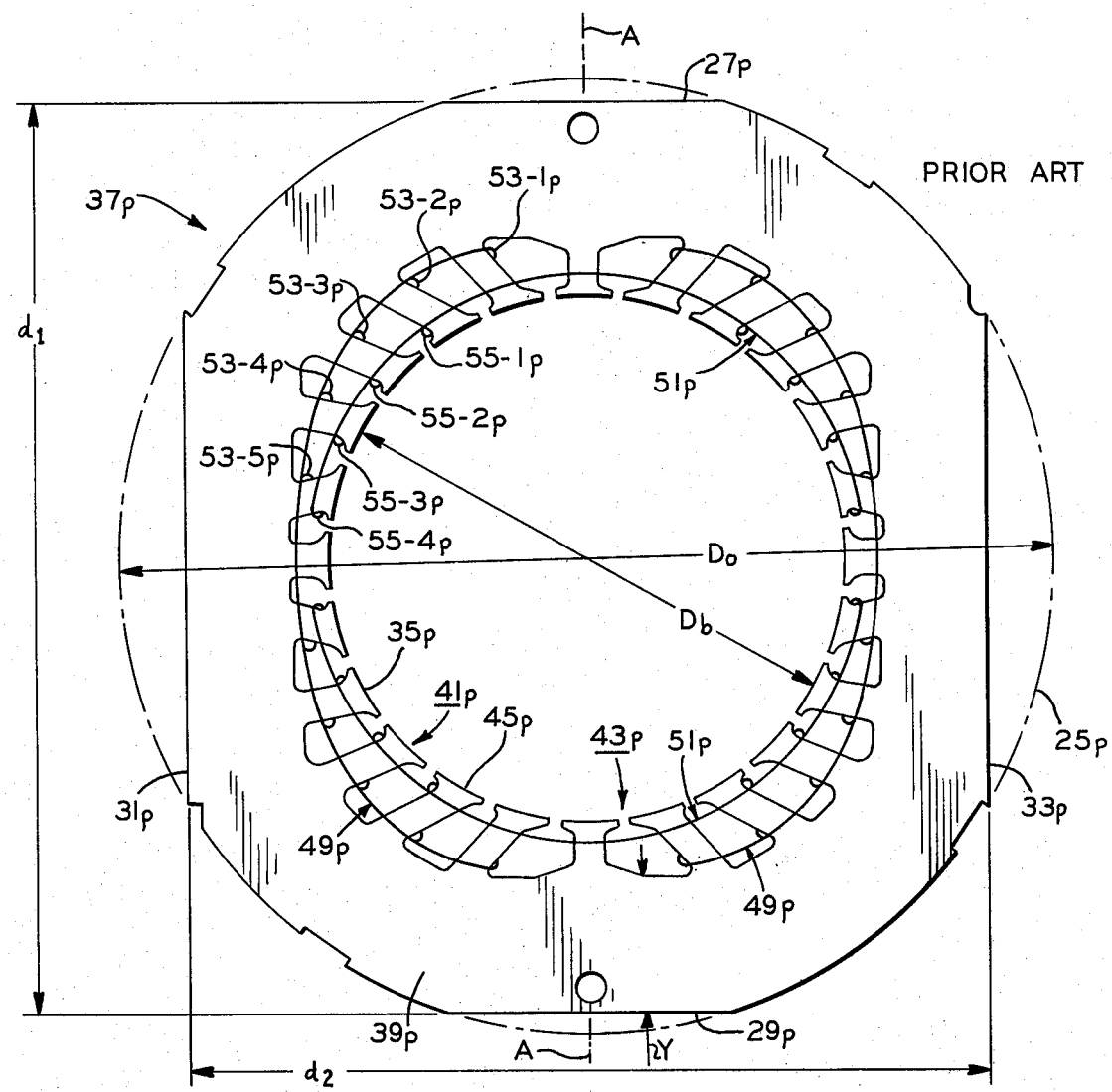
PRIOR ART
FIG. 4
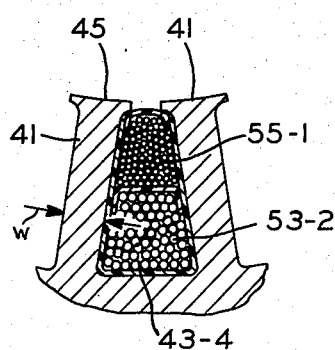
FIG. 3
| DIMENSIONLESS RATIO | IDEAL STATOR 37 (FIG 2) | STATOR 37p (FIG 4) |
|---|---|---|
| $D_o/D_b$ | 1.99 | 1.80 |
| $d_1/D_b$ | 1.98 | 1.72 |
| $d_2/D_b$ | 1.73 | 1.55 |
| $d_2/D_o - D_b$ | 1.74 | 1.92 |
| $t_w/D_o - D_b$ | 1.52 | 1.83 |
| $P_y/D_o - D_b$ | .58 | .66 |
FIG. 5

DYNAMOELECTRIC MACHINE AND STATIONARY ASSEMBLY THEREFOR

FIELD OF THE INVENTION

This invention relates generally to dynamoelectric machines and in particular to an improved stationary assembly therefor.

BACKGROUND OF THE INVENTION

In the past, various and sundry different types of dynamoelectric machines have been manufactured in very high volumes for use in various apparatus or appliances, such as air conditioners, washing machines, clothes dryers as well as others for instance, and these dynamoelectric machines have for the most part been split phase induction motors of the single phase type. The continued use of split phase induction motors through the years has been primarily based on the economics involved in their manufacture; however, in the light of the recently encountered fuel shortages and the analogous power shortages effected thereby, the operating characteristics and running performances of these motors are becoming more critical. In this vein, various past approaches have been made to provide stator constructions having winding arrangements approaching that of an electromagnetically balanced motor while also effectively utilizing the stator magnetic material under running conditions to enhance the running performance of the motor without appreciably imparing the starting characteristics thereof. One such approach may be seen in my U.S. Pat. No. 3,235,762 issued Feb. 15, 1966 which is incorporated by reference herein. In general, the approach of that patent was to relate the magnetic cross section regions of the stator yoke and the teeth sections thereof at preselected locations of each primary pole to the peak lines of flux produced in those particular regions by the excited winding under normal running or operating conditions. It is now believed that further refinements in the magnetic characteristics of the stator are necessary in order to effect optimization thereof at preselected operating load conditions of the motor.

OBJECTS OF THE INVENTION

Among the several objects of the present invention may be noted the provision of an improved two pole dynamoelectric machine having a stationary assembly with optimized magnetic characteristics with respect to a preselected load at which the dynamoelectric machine is intended to be operated; the provision of such improved two pole dynamoelectric machine in which certain dimensionless ratios of the stationary assembly are interrelated with respect to each other and generally correlated with the preselected operating load conditions of the dynamoelectric machine; the provision of such improved two pole dynamoelectric machine having a peak efficiency generally at the preselected operating load condition thereof; and the provision of such improved two pole dynamoelectric machine having components which are simplistic in design, economically manufactured, and easily assembled. These as well as other objects and advantageous features of the present invention will be in part apparent and in part pointed out hereinafter.

In general, a two-pole dynamoelectric machine in one form of the invention has a stationary assembly with a two pole winding means disposed thereon. A rotatable assembly is arranged in magnetic coupling relation with the stationary assembly, and means is associated with the stationary assembly for rotatably supporting the rotatable assembly. The stationary assembly includes a plurality of stacked laminations and the laminations have: a preselected magnetic reference circumference of a first diameter; a first pair of oppositely disposed sides spaced apart a first linear dimension; and a second pair of oppositely disposed sides spaced apart a second linear dimension at an angular location with respect to the first side pair. One of the first linear dimension and the second linear dimension is generally about the same as the first diameter and is greater than the other of the first linear dimension and the second linear dimension. The lamination also include a bore generally concentric with the preselected magnetic reference circumference and disposed about a part of the rotatable assembly. The bore has a second diameter wherein a first dimensionless rotor between the second linear dimension and the second diameter is greater than about 1.60 and a second dimensionless ratio between the first linear dimension and the second diameter is greater than about 1.80.

Also in general and also in one form of the invention, a two pole dynamoelectric machine has a stationary assembly with a two pole winding means disposed thereon. A rotatable assembly is arranged in magnetic coupling relation with the stationary assembly, and means is associated with the stationary assembly for rotatably supporting the rotatable assembly. The stationary assembly comprises a plurality of stacked laminations which include: a preselected magnetic reference circumference of a first diameter (Do); and a bore generally concentric with the preselected magnetic reference circumference and disposed about a part of the rotatable assembly. The bore has a second diameter (Db) wherein a first dimensionless ratio between the first diameter and the second diameter is greater than about 1.85. The laminations also include a plurality of spaced apart teeth (t) defining in part the bore and having an average cross-sectional width (w), respectively, wherein a second dimensionless ratio of $(tw)/(Do-Db)$ is less than about 1.75.

BRIEF DESCRIPTION OF THE DRAWINGS

FIG. 3 is an enlarged fragmentary view of one of the large winding accommodating slots of the stator of FIG. 2 illustrating coil groups of both the main and auxiliary windings of the stator therein;

FIG. 4 is a plan view of a prior art stator or stationary assembly for a two pole dynamoelectric machine illustrated for comparison purposes; and FIG. 5 is a listing of ideal dimensionless ratios of the stator for the dynamoelectric machine of FIG. 2 and the prior art stator of FIG. 4.

Corresponding reference numerals refer to corresponding parts throughout the several views of the drawings.

The exemplifications of the invention set out herein illustrate the preferred embodiment of the invention in one form thereof, and such exemplifications are not to be construed as limiting the scope of the disclosure or the scope of the invention in any manner.

DETAILED DESCRIPTION OF THE PREFERRED EMBODIMENT

Figure 1:
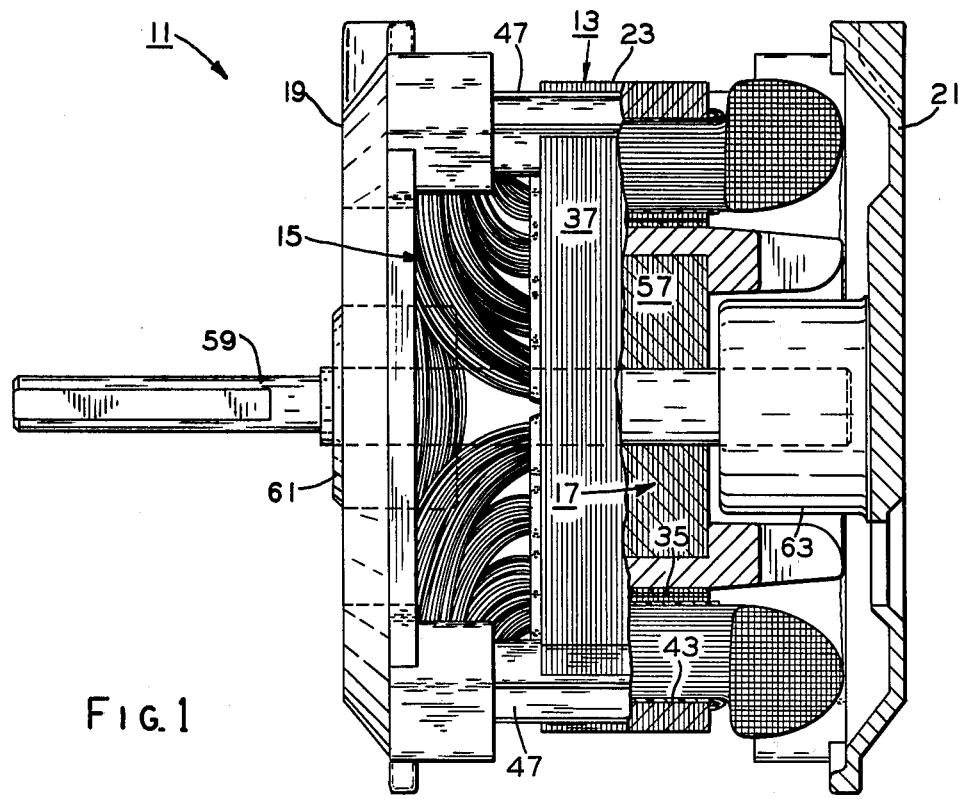
FIG. 1 is a partial sectional view of a two pole dynamoelectric machine in one form of the invention.
Figure 2:
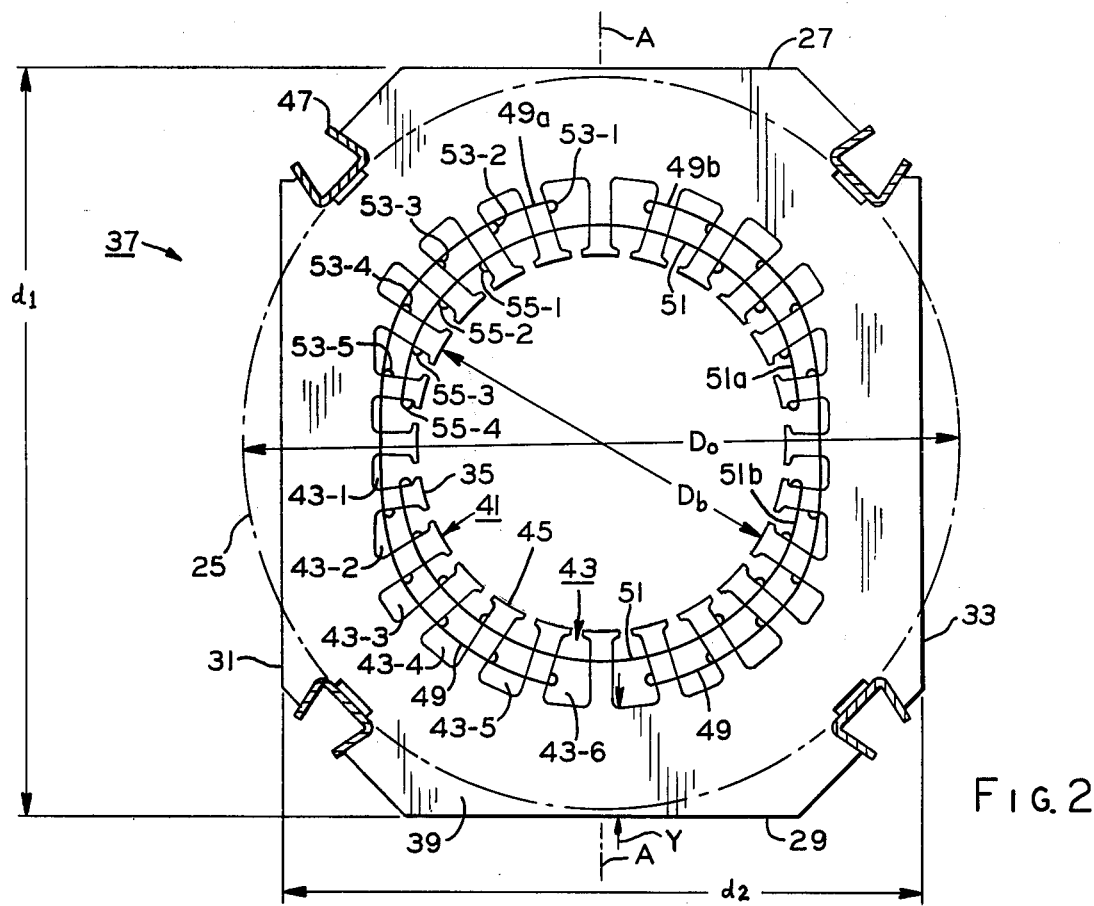
FIG. 2 is a sectional, partially schematic view taken along line 2—2 of FIG. 1 illustrating a stationary assembly or stator of the two pole dynamoelectric machine and its winding circuitry.

Referring now to the drawings in general, a two pole single phase alternating current dynamoelectric machine 11 in one form of the invention may be of a split phase type, if desired, and has a stationary assembly 13 with a preselected number of poles P illustrated by two pole winding means 15 disposed thereon (FIGS. 1 and 2). A rotatable assembly 17 is arranged in magnetic coupling relation with stationary assembly 13, and means, such as a pair of end frames or plates 19, 21 for instance, is associated with the stationary assembly for rotatably supporting the rotatable assembly (FIG. 1). Stationary assembly 13 includes a plurality of stacked laminations 23, and the laminations comprise a preselected magnetic reference circumference 25 having a diameter Do, a pair of oppositely disposed sides 27,29 spaced apart a preselected linear dimension or distance d1, and another pair of oppositely disposed sides 31,33 spaced apart another preselected linear dimension or distance d2 at an angular location with respect to side pair 27,29 (FIG. 2). Linear dimension (d1) is generally about the same as diameter (Do) and greater than linear dimension (d2), and a bore 35 is also provided in laminations 23 generally concentric with preselected magnetic reference circumference 25 and disposed about a part of rotatable assembly 17 (FIG. 1). Bore 35 has another diameter (Db) wherein a dimensionless ratio of laminations 23 between linear dimension (d2) and diameter (Db) is greater than about 1.60 and another dimensionless ratio between linear dimension (d1) and diameter (Db) is greater than about 1.80 (FIG. 2).

More particularly and with specific reference to FIGS. 1 and 2, stationary assembly 13 comprises a ferromagnetic stator or stator core 37, such as for instance stacked laminations 23 which may be conveniently formed from generally thin magnetic sheet material. Stator 37 includes a peripheral or outside yoke or section 39, and a plurality of spaced apart teeth 41 integrally extend generally radially inwardly from the yoke so as to define therewith a plurality of slot means or winding accommodating slots 43. Slots 43 are disposed generally between adjacent ones of teeth 41, and inner ends 45 of the teeth mutually and in part define bore 35 through which rotatable assembly 17 extends. In the illustrated embodiment, stator 37 is provided with twenty-four equally spaced apart slots 43 which are distributed generally in two pole fashion, i.e. symmetrically about a polar axis indicated by a dashed line A, as discussed hereinafter, and it may be noted that six different ones of slots 43, i.e., slots 43-1, 43-2, 43-3, 43-4, 43-5 and 43-6 are sized and/or shaped differently in each pole of stator 37. While slot 43-4 is the largest of the slots, it may be noted that slots 43-4, 43-5 and 43-6 are approximately the same size, and it contemplated that the sizes of such slots may be equal, if desired, within the scope of the invention so as to meet the objects thereof. The larger slots 43-4, 43-5 and 43-6 are located adjacent side pairs 27,29, and the maximum sections of yoke 39 are arranged between such larger slots and side pairs 27,29, respectively. As best seen in FIG. 3, it may also be noted that teeth 41 are provided with a cross-sectional dimension or tooth width (w) i.e., between the inner ends 45 of the teeth and their connection with yoke 39, which are generally equal; however, it is contemplated that teeth having different widths and/or varying widths may be employed in stator 37 within the scope of the invention so as to meet the objects thereof. As referred to hereinafter, the average tooth width (w) is an averaging of the width of teeth 41 measured across the least dimension or narrowest cross-section thereof (as shown by dimensional arrows in FIG. 3) between inner ends 45 and yoke 39, respectively. It is also contemplated that at least some of teeth 41 may not extend radially and that the sizes and/or shapes of slots 43 may differ within the scope of the invention so as to also meet the objects thereof. Further, if desired, teeth 47 may be graded as shown in my aforementioned U.S. Pat. No. 3,235,762 within the scope of the invention so as to meet the objects thereof.

A plurality of structural members, such as beams 47 or the like for instance as best seen in FIG. 1, are carried by or otherwise fixedly connected to stator 37 generally adjacent the corners thereof, i.e., the portions between adjacent sides of side pair 27,29 and side pair 31,33 on lamination 23, respectively, and the opposite ends of the beams are fixedly connected by suitable means to end plates 19,21, respectively. If a more detailed discussion of the connection of beams 47 to stator 37 or to end plates 19,21 is desired, reference may be had to U.S. Pat. No. 3,858,067 issued Dec. 31, 1974 to Charles W. Otto and U.S. Pat. No. 3,867,654 issued Feb. 18, 1974 to Charles W. Otto, and each of these patents is specifically incorporated by reference herein. It is, however, contemplated that other means may be utilized to associate stator 37 with end plates 19,21 within the scope of the invention so as to meet the objects thereof.

Winding means 15 has a selected two pole configuration and includes a two pole main or run winding 49 and a two pole auxiliary or start winding 51 which may, if desired, be concentric as seen in FIG. 2. Main windings 49 are arranged in selected ones of slots 43, i.e. slots 43-2, 43-3, 43-4, 43-5, and 43-6, so as to form two diametrically opposite main or running poles aligned on polar axis A. Main winding 49 is divided into two sections 49a, 49b, each forming one of the main poles and each comprising a plurality of coils 53 disposed in the aforementioned selected ones of slots 43. (Auxiliary) winding 51 is similarly disposed in selected ones of slots 43 and forms two auxiliary poles which are respectively displaced from the main poles by a predetermined angular amount. In the illustrated exemplification, the two auxiliary winding poles are distributed generally about stator 37 so as to provide a quadrature type winding arrangement, i.e., the radial centerline of the auxiliary winding poles are displaced on stator 37 from that of the main winding poles at electrical angles of about ninety electrical degrees. Auxiliary winding 51 is also divided into two sections 51a, 51b, each forming one of the auxiliary poles and each comprising a plurality of coils 55 disposed in the aforementioned selected ones of slots 43. Of course, in the winding arrangement disclosed herein, a number of slots 43 are shared by at least one side of both the main and auxiliary winding coils. For example, coils 53,55 of main winding 47 and auxiliary winding 51 may be, if desired, grouped in the following turn distribution:

| $\frac{53-1}{38}$ | $\frac{53-2}{36}$ | $\frac{53-3}{31}$ | $\frac{53-4}{24}$ | $\frac{53-5}{15}$ |
|---|---|---|---|---|
| $\frac{55-4}{26}$ | $\frac{55-3}{24}$ | $\frac{55-2}{20}$ | $\frac{55-1}{15}$ | |

Of course, the above turn distribution of the coil groups is merely representative of that which may be utilized in the illustrated preferred embodiment, and it is contemplated that other turn distribution and winding arrangements may be employed within the scope of the invention so as to meet the objects thereof. For instance, it is also contemplated that the relationship between the sections of yoke 39 and teeth 41 may be related along with the winding arrangement generally as illustrated in my aforementioned U.S. Pat. No. 3,235,762.

Rotatable assembly includes a ferromagnetic rotor 57 rotatably disposed in bore 35 of stator 37 so as to be magnetically coupled therewith upon the energization of dynamoelectric machine 11, as best seen in FIG. 1, and the rotor is mounted on a shaft 59 for conjoint rotation therewith. Opposite portions of shaft 59 are rotatably received or otherwise suitably journaled or supported in bearing means (not shown) within a pair of hubs 61,63 associated with end plates 19,21, respectively.

Assuming that dynamoelectric machine 11 is to be utilized to drive a particular apparatus or appliance, such as for instance a dishwasher or the like (not shown), then the load conditions imposed upon the dynamoelectric machine may, of course, be accurately ascertained. Thus, it is advantageous and desirable to provide stator 37 of dynamoelectric machine 11 with magnetic characteristics which are optimized so that the electromagnetic performance of the dynamoelectric machine are such as to meet generally only the aforementioned ascertained load conditions or preselected operating load conditions of the dynamoelectric machine. As discussed in greater detail hereinafter, this optimization of the magnetic characteristics may be accomplished, at least in part, by interrelating certain or selected ones of the dimensions of stator 37 and correlating them with respect to the ascertained load condition at which dynamoelectric machine 11 is to be operated. In other words, the selected stator dimensions are interrelated with each other so as to define the magnetic characteristics of stator 37 necessary for effecting a peaking efficiency of dynamoelectric machine 11 at the aforementioned ascertained load condition thereof. Thus, the stator dimensions are utilized as parameters which are to be associated in such manner as to provide certain or preselected dimensionless ratios defining the optimized magnetic characteristics of stator 37 so as to provide, for instance, the best chances for complete flux saturation therein at the ascertained load or normal running condition of dynamoelectric machine 11. These dimensionless ratios are illustrated in FIG. 5 with ideal values thereof listed both for laminations 23 and for prior art lamination 23p which is shown in FIG. 4 for comparison purposes.

Magnetic reference circumference 25 is preselected to insure that for a given performance of dynamoelectric machine 11 at the aforementioned ascertained load condition thereof, all sections of lamination 23 may be able to become saturated generally at the same time. Thus, diameter Do of magnetic reference circumference 25 may be related to diameter Db of rotor 57 so that a dimentionless ratio therebetween is greater than about 1.87. In actuality, the dimensionless ratio Do/Db may be about 1.99 for the illustrated embodiment thereof. Having established this dimensionless ratio of Do/Db, it may be seen that if Db was decreased, the air gap density between stator 37 and rotor 57 would also increase resulting in heat generation so as to impare cooling of dynamoelectric machine 11. Contrarily, if Db was increased, slots 43 would also be decreased in size necessitating the use of smaller winding wire which would result in greater copper losses. In order to overcome this, it would be necessary to increase the stack length of laminations 23 which, of course, is undesirable. It may also be noted that diameter Do of magnetic reference circumference 25 is also related to dimensions d1, d2 of side pairs 27,29 and 31,33 of lamination 23 wherein diameter Do is approximately or generally the same as dimension d1 and greater than dimension d2.

Bore diameter Db may be related in dimensionless ratios to both the dimensions d1 and d2 of side pairs 27,29 and 31,33, respectively, so that in the embodiment illustrated herein, d1/Db is greater than about 1.80 and d2/Db is greater than about 1.60. Having established the dimensionless ratios d1/Db and d2/Db, it may be seen that if either dimension d1 or d2 is decreased, then yoke 39 would become restricted in the center section thereof adjacent side pairs 27,29 and 31,33, respectively, thereby to impare flux passage through the yoke. Another detrimental feature with respect to decreasing either dimensions d1 or d2 is believed to be that too much material would be disposed in the corners of laminations 23 which would not be working, i.e. not saturated. In order to compensate for decreased dimensions d1, d2, it would be necessary to increase the stack length of laminations which, of course, would be undesirable.

In view of the above discussed dimensionless ratios between dimensions d1,d2 and bore diameter Db and also the dimensionless ratio between diameter Do and bore diameter Db, it may be seen tht related dimensionless ratios, such as d1/Do−Db and d2/Do−Db, may also be effective in establishing the magnetic characteristics of stator 37. Generally the same comments set out hereinabove with respect to ratios d1/Db and d2/Db are also applicable to the ratios d1/Do−Db and d2/Do−Db. In the illustrated embodiment, the dimensionless ratio d1/Do−Db may be less than about 1.80, and the dimensionless ratio d2/Do−Db may be less than about 2.10. It may be noted that in the two pole construction of lamination 23, dimension d1 between side pair 27,29 is greater than dimension d2 between side pair 31,33 in order to provide a maximum section of the width y of yoke 39 adjacent the larger ones of slots 43, such as slots 43-4, 43-5 and 43-6, respectively, which, as previously mentioned, receive main windings 49. Thus, it may be noted that another dimensionless ratio Py/Do−Db may also be interrelated with respect to the above discussed ratios where P is the number of poles in stator 37 and y is the width of yoke 39. In the illustrated embodiment, dimensionless ratio Py/Do−Db is believed to have an optimizing value of generally about 0.58, as set out in the listing of FIG. 4, which is, of course, within the range of between about 0.53 and about 0.65. Having established the dimensionless ratio Py/Do−Db, it may be seen that decrease in the value y would cause yoke 39 to saturate but teeth t probably would not saturate, i.e., would have a low flux density. Therefore, it is believed that all of the material in the laminations 23 would not be working to its fullest extent, i.e., would not be completely saturated.

Another dimensionless ratio which may also be interrelated with respect to the above discussed ratios is wt/Do−Db where w is the average width of teeth 41 and t is the number of the teeth in laminatins 23 of stator 37. In the illustrated embodiment, dimensionless ratio wt/Do−Db is less than about 1.75 and may be within a range of between about 1.45 and about 1.75, and it is believed an optimizing value for such ratio as related to the illustrated embodiment would generally about 1.52. Having established the dimensionless ratio wt/Do−Db, it may be seen that a decrease in the product of dimensions tw would result in greater saturation of teeth 41 with an accompanying decrease of the saturation in yoke 39. Thus, yoke 39 would not be working to its capacity, i.e. not carrying an optimized value of the flux. In order to reduce such high flux density condition in teeth 41, it would be necessary to increase the stack height of lamination 23 which would, of course, be undesirable.

As previously mentioned and with reference to FIG. 4, another prior art two pole stator lamination 23p is shown for comparison purposes, and the values of the above discussed dimensionless ratios for this prior art lamination is compared in FIG. 5 with those of the present invention. Reference numerals of prior art lamination 23p are designated with the letter p so as to simplify comparison of the components thereof with corresponding components of laminations 23 of the present invention.

In summary, with the use of the present invention in a stator, it is not only possible to take full advantage of a winding arrangement approaching that of an electromagnetically balanced motor but in addition it is also possible to provide the stator thereof with optimized magnetic characteristics in order to gear the performance of the motor to a preselected or ascertained load condition at which the motor is intended to be operated. Further, by providing the stator with the aforementioned optimized magnetic characteristics, economics may be had not only with respect to savings in stator material but also with respect to power operating efficiencies of the motor.

From the foregoing, it is now apparent that an improved dynamoelectric machine 11 and stationary assembly 13 have been provided meeting the objects and advantages set out hereinbefore, as well as others, and that changes may be made by those having ordinary skill in the art as to the precise arrangements, shapes, connections and details of the construction set forth herein without departing from the spirit of the invention or the scope thereof as set out in the claims which follow.

What I claim as new and desire to secure by Letters Patent of the United States is:

1. For use in a two pole single phase alternating current dynamoelectric machine; a stationary assembly comprising a plurality of stacked laminations including a preselected magnetic reference circumference of a first diameter (Do), a first pair of oppositely disposed sides spaced apart a first linear dimension (D1), a second pair of oppositely disposed sides spaced apart a second linear dimension (d2) at an angular location with respect to said first side pair, one of said first linear dimension (d1) and said second linear dimension (d2) being generally about the same as said first diameter (Do) and greater than the other of said first linear dimension (d1) and said second linear dimension (d2), a bore generally concentric with said preselected magnetic reference circumference, said bore having a second diameter (Db) wherein a first dimensionless ratio between said second linear dimension (d2) and said second diameter (Db) is greater than about 1.60, a second dimensionless ratio between said first linear dimension (d1) and said second diameter (Db) is greater than about 1.80 and a third dimensionless ratio between said second linear dimension (d2) and the difference of said first diameter (Do) and said second diameter (Db) which is less than about 1.99, a plurality of spaced apart teeth (t) respectively having inner end portions defining said bore and having an average tooth width (w) wherein a fourth dimentionless ratio between the product of said teeth plurality (t) and said average tooth width (w) and the difference of said first diameter (Do) and said second diameter (Db) is in a range of between about 1.45 and about 1.75 and wherein a fifth dimensionless ratio between said second diameter (Db) and said product of said teeth plurality (t) and said average tooth width (w) is also in a range of about 1.45 and about 1.70, a plurality of winding slots disposed between adjacent teeth of said teeth plurality (t), some of said winding slots of said plurality thereof being predeterminately larger than others of said winding slots, a yoke portion extending generally between said winding slots and said first and second side pairs and having a pair of maximum sections located generally between said some larger slots and said first side pair, and at least one distributed winding including a plurality of coils arranged in coil groups in at least some of said some larger winding slots to form a pair of running poles upon the excitation of said winding with each of said running poles spanning a preselected number of said teeth.

2. A two pole single phase alternating current dynamoelectric machine adapted to be operated generally at a preselected load condition comprising a stationary assembly having a two pole winding means disposed thereon; a rotatable assembly arranged in magnetic coupling relation with said stationary assembly; means associated with stationary assembly for rotatably supporting rotatable assembly; said stationary assembly including a plurality of stacked laminations having a preselected magnetic reference circumference of a first diameter (Do), a bore generally concentric with said preselected magnetic reference circumference and disposed about a part of said rotatable assembly, said bore having a second diameter (Db) wherein a first dimensionless ratio between said first diameter (Do) and said second diameter (Db) is less than 1.99, and a plurality of spaced apart teeth (t) defining said bore and having an average tooth width (w) wherein a second dimensionless ratio of $$t\,w/(Do-Db)$$

is less than about 1.75.

3. A dynamoelectric machine as set forth in claim 2 wherein said laminations of said plurality thereof further include a third dimensionless ratio of $$t\,w/Db$$

which is less than about 1.70.

4. A dynamoelectric machine as set forth in claim 2 wherein said laminations of said plurality thereof further include a plurality of slot means disposed between adjacent teeth of said teeth plurality with said slot means plurality having at least six different sized slot means arranged to accommodate a part of said winding means in each pole thereof.

5. A dynamoelectric machine as set forth in claim 2 wherein said second dimensionless ratio of $$t\,w/Do-Db$$

is in a range of between about 1.45 and about 1.75.

6. A dynamoelectric machine as set forth in claim 3 wherein said third dimensionless ratio of $$t\,w/Db$$

is in a range between about 1.45 and about 1.70.

7. For use in a two pole single phase alternating current motor; a stationary assembly comprising a plurality of stacked laminations including first and second pairs of oppositely disposed sides angularly located with respect to each other and spaced apart by first and second linear dimensions, respectively, said first linear dimension being predeterminately greater than said second linear dimension, a magnetic reference circumference having a first diameter generally about the same as said first linear dimension, a yoke bounded by said first and second side pairs, a plurality of angularly spaced apart teeth extending inwardly of said yoke to form a plurality of winding slots therebetween, some of said winding slots of said plurality thereof being predeterminately larger than others of said winding slots with said some larger winding slots being located adjacent said first side pair, respectively, a pair of maximum sections of said yoke respectively located generally between said some larger teeth and said first side pairs, and an end portion on each of said teeth of said plurality thereof and defining a bore spaced between said first and second side pairs and generally concentric with said magnetic reference circumference, said bore having a second diameter wherein a first dimensionless ratio between said first linear dimension and said second diameter is greater than about 1.80 and a second dimensionless ratio between said second linear dimension and said second diameter is greater than about 1.60; at least one distributed winding including a plurality of coils arranged in concentric coil groups in at least some of said some larger winding slots to form a pair of running poles upon the excitation of said winding with each of said running poles spanning a preselected number of said teeth.

8. A dynamoelectric machine as set forth in claim 7 wherein said laminations of said plurality thereof further comprise another dimensionless ratio between said first diameter and said second diameter and which ratio is greater than about 1.85.

9. A dynamoelectric machine as set forth in claim 7 wherein said laminations of said plurality thereof further comprise another dimensionless ratio between said second linear dimension and the difference of said first diameter and said second diameter and which ratio is less than about 1.99.

10. A dynamoelectric machine as set forth in claim 7 wherein said laminations of said plurality thereof further comprise a third dimensionless ratio between said first diameter and said second diameter and which ratio is greater than about 1.85, and a fourth dimensionless ratio between said second linear dimension (d2) and the difference of said first diameter (Do) and said second diameter (Db) which is less than about 1.99.

11. A dynamoelectric machine as set forth in claim 7 wherein said winding slots include at least six different sized slots.

12. A two pole single phase alternating current split phase type dynamoelectric machine adapted to be operated at a preselected load condition, the dynamoelectric machine comprising: a stationary assembly having a two pole winding means disposed thereon; a rotatable assembly arranged in magnetic coupling relation with said stationary assembly upon the excitation of said winding means; means associated with said stationary assembly for rotatably supporting said rotatable assembly; and said stationary assembly including a plurality of stacked laminations comprising a preselected magnetic reference circumference of a first diameter (Do), a first pair of oppositely disposed sides spaced apart a first linear dimension (d1), a second pair of oppositely disposed sides spaced apart a second linear dimension (d2) at an angular location with respect to said first side pair, one of said first linear dimension (d2) being generally about the same as said first diameter (Do) and greater than the other of said first linear dimension (d1) and said second linear dimension (d2), a bore generally concentric with said preselected magnetic reference circumference and disposed about said rotatable assembly, said bore having a second diameter (Db) wherein a first dimensionless ratio between said second linear dimension (d2) and said second diameter (Db) is greater than about 1.60 and a second dimensionless ratio between said first linear dimension (d1) and said second diameter (Db) is greater than about 1.80, a plurality of spaced apart teeth (t) having an average tooth width (w), and a plurality of means for receiving a part of said winding means interposed between adjacent ones of said teeth, respectively, wherein a third dimensionless ratio $$t\,w/(Do-Db)$$

is less than about 1.75.

13. A dynamoelectric machine as set forth in claim 12 wherein a fourth dimensionless ratio $$t\,w/Db$$

is less than about 1.70.

14. A dynamoelectric machine as set forth in claim 12 wherein said third dimensionless ratio is in a range of between about 1.45 and about 1.75.

15. A dynamoelectric machine as set forth in claim 12 further comprising a fourth dimensionless ratio between said first diameter (Do) and said second diameter (Db) which ratio is greater than 1.85.

16. A dynamoelectric machine as set forth in claim 12 further comprising a fourth dimensionless ratio between said second linear dimensions (d2) and the difference of said first diameter (Do) and said second diameter (Db) and which ratio is less than about 1.99.

17. A stationary assembly for a dynamoelectric machine adapted to be operated generally at a preselected load condition, the stationary assembly comprising a ferromagnetic stator having a preselected magnetic reference circumference with a diameter (Do), a bore in said stator generally concentric with said preselected magnetic reference circumference thereof and having another diameter (Db) wherein a dimensionless ratio between said first named diameter (Do) and said another diameter (Db) is less than 1.99, and a plurality of spaced apart teeth (t) in said stator defining at least in part said bore and having an average tooth width (w) wherein another dimensionless ratio of $$tw/Do-Db$$

is less than about 1.75.

18. A stationary assembly as set forth in claim 17 wherein said first named dimensionless ratio is in a range between about 1.87 and 1.99.

19. A stationary assembly as sete forth in claim 17 wherein said another dimensionless ratio is in a range of about 1.45 and about 1.75.

20. A stationary assembly as set forth in claim 17 further comprising a third dimensionless ratio of $$tw/Db$$

which is less than about 1.70.

21. A stationary assembly as set forth in claim 20 wherein said third dimensionless ratio is in a range between about 1.45 and about 1.70.

22. A dynamoelectric machine adapted to be operated generally at a preselected load condition comprising a stationary assembly having a winding arrangement associated therewith so as to define a preselected number of poles (P); a rotatable assembly associated with said stationary assembly; and said stationary assembly including a plurality of stacked laminations comprising a preselected magnetic reference circumference having a diameter (Do), a bore generally concentric with said diameter (Do) and disposed about said rotatable assembly, said bore having another diameter (Db) wherein a first dimensionless ratio between said first named diameter (Do) and said another diameter (Db) is greater than 1.80 a yoke having a width (y) wherein a second dimensionless ratio $$Py/Do-Db$$

is less than about 0.58, a plurality of teeth (t) defining said bore and having an average tooth width (w), and slot means interposed between adjacent ones of said teeth for accommodating said winding arrangement wherein a third dimensionless ratio $$tw/Do-Db$$

is less than about 1.75.

23. A dynamoelectric machine as set forth in claim 22 wherein said third dimensionless ratio is in a range of between about 1.45 and about 1.75.

24. A dynamoelectric machine as set forth in claim 22 further comprising first and second opposite pairs of sides angularly disposed with respect to each other on said stationary assembly and spaced apart by first and second linear dimensions (d1, d2), respectively, one of said first and second dimensions being generally about the same as said first named diameter (Do) and greater than the other of said first and second dimensions.

25. A dynamoelectric machine as set forth in claim 22 wherein a third dimensionless ratio between said second linear dimension (d2) and said another diameter (Db) is greater than about 1.60.

26. A dynamoelectric machine as set forth in claim 22 wherein a third dimensionless ratio between said first linear dimension (d1) and said another diameter (Db) is greater than about 1.80.

27. A dynamoelectric machine as set forth in claim 22 wherein said first dimensionless ratio is in a range between about 1.80 and about 1.99.

* * * * *